US011676288B2

(12) United States Patent
Smith

(10) Patent No.: US 11,676,288 B2
(45) Date of Patent: *Jun. 13, 2023

(54) LEARNED FEATURE MOTION DETECTION

(71) Applicant: Imagination Technologies Limited, Kings Langley (GB)

(72) Inventor: Timothy Smith, London (GB)

(73) Assignee: Imagination Technologies Limited, Kings Langley (GB)

( * ) Notice: Subject to any disclaimer, the term of this patent is extended or adjusted under 35 U.S.C. 154(b) by 53 days.

This patent is subject to a terminal disclaimer.

(21) Appl. No.: 17/346,986

(22) Filed: Jun. 14, 2021

(65) Prior Publication Data
US 2021/0303832 A1 Sep. 30, 2021

Related U.S. Application Data

(63) Continuation of application No. 16/510,509, filed on Jul. 12, 2019, now Pat. No. 11,068,703, which is a (Continued)

(30) Foreign Application Priority Data

Mar. 24, 2016 (GB) ..................... 1605116

(51) Int. Cl.
*G06T 7/246* (2017.01)
*G06V 40/20* (2022.01)
*G06F 18/22* (2023.01)

(52) U.S. Cl.
CPC .............. *G06T 7/246* (2017.01); *G06F 18/22* (2023.01); *G06V 40/20* (2022.01); *G06T 2207/20021* (2013.01); *G06T 2207/20081* (2013.01)

(58) Field of Classification Search
CPC ...... G06V 40/20; G06V 10/40; G06V 30/194; G06K 9/6215; G06T 7/246;
(Continued)

(56) References Cited

U.S. PATENT DOCUMENTS 9,043,069 B1 5/2015 Ferguson et al.
2005/0018772 A1 1/2005 Sung et al.
(Continued)

FOREIGN PATENT DOCUMENTS

CN 101352029 A 1/2009
CN 102693007 A 9/2012
(Continued)

OTHER PUBLICATIONS

Calonder et al., "BRIEF: Binary Robust Independent Elementary Features," ECCV'10 Proceedings of the 11th European conference on Computer vision: Part IV pp. 778-792, Heraklion, Crete, Greece —Sep. 5-11, 2010.
(Continued)

*Primary Examiner* — Stephen P Coleman
(74) *Attorney, Agent, or Firm* — Potomac Law Group, PLLC; Vincent M DeLuca

(57) ABSTRACT

A data processing device for detecting motion in a sequence of frames each comprising one or more blocks of pixels, includes a sampling unit configured to determine image characteristics at a set of sample points of a block, a feature generation unit configured to form a current feature for the block, the current feature having a plurality of values derived from the sample points, and motion detection logic configured to generate a motion output for a block by comparing the current feature for the block to a learned feature representing historical feature values for the block.

20 Claims, 5 Drawing Sheets

Related U.S. Application Data continuation of application No. 15/468,396, filed on Mar. 24, 2017, now Pat. No. 10,395,102.

(58) Field of Classification Search
CPC . G06T 2207/20021; G06T 2207/20081; G06T 2207/10016; G06T 7/215; G06T 5/40; H04N 5/144; H04N 7/18
USPC .......................................................... 382/103
See application file for complete search history.

(56) References Cited

U.S. PATENT DOCUMENTS

| | | | |
|---|---|---|---|
| 2008/0152236 | A1 | 6/2008 | Vendrig et al. |
| 2010/0050134 | A1 | 2/2010 | Clarkson |
| 2014/0267801 | A1 | 9/2014 | Grundmann et al. |
| 2014/0286530 | A1 | 9/2014 | Ohira et al. |
| 2015/0199585 | A1* | 7/2015 | Oh .................. G06V 10/757 382/201 |
| 2016/0078306 | A1 | 3/2016 | Artan et al. |
| 2017/0223308 | A1 | 8/2017 | Chen et al. |

FOREIGN PATENT DOCUMENTS

| | | |
|---|---|---|
| CN | 104680504 A | 6/2015 |
| WO | 2013/093771 A1 | 6/2013 |

OTHER PUBLICATIONS

Chen et al.,"A New Adaptive Background Updating Method for Motion Detection," ICISCE 2012, available at http://opensample.info/a-new-adaptive-background-updating-method-for-motion-detection.

Goyette et al., "Changedetection.net: A New Change Detection Benchmark Dataset," IEEE Conference on Computer Vision and Pattern Recognition, TR2012-044, Jun. 2012.

Heikkila et al., "A Texture-Based Method for Modeling the Background and Detecting Moving Objects," IEEE Transactions on Pattern Analysis and Machine Intelligence 28(4):657-62—May 2006.

Calonder et al; "BRIEF: Computing a Local Binary Descriptor Very Fast"; IEEE Transactions on Pattern Analysis and Machine Intelligence, vol. 34; No. 7; Jul. 2012; p. 1281-1298.

Chen et al; "Efficient Hierarchical Method for Background Subtraction"; Pattern Recognition 40 (2007); Elsevier, GB, vol. 40; No. 10; May 24, 2007; pp. 2706-2715.

Heikkila et al; "A Texture-based Method for Detecting Moving Objects"; Proc. British Machine Vision Conf; vol. 1; 2004 pp. 1-10.

Ioannidis; The History of Histograms (abridged); Department of Informatics and Telecommunications; Proceedings of the Twenty-Ninth International Conference on Very Large Databases; Sep. 9, 2003; pp. 19-30.

Krig, "Interest Point Detector and Feature Descriptor Survery" In: "Computer Vision Metrics. Survey, Taxonomy, and Analysis", May 26, 2014, Springer, US; pp. 227-240.

Zhang et al; "Dynamic Background Subtraction Based on Local Dependency Histogram"; International Journal of Pattern Recognition and Artificial Intelligence; vol. 23; No. 7; 2009; pp. 1397-1419.

\* cited by examiner

LEARNED FEATURE MOTION DETECTION

CROSS-REFERENCE TO RELATED APPLICATIONS AND CLAIM OF PRIORITY

This application is a continuation under 35 U.S.C. 120 of copending application Ser. No. 16/510,509 filed Jul. 12, 2019, which is a continuation of prior application Ser. No. 15/468,396 filed Mar. 24, 2017, now U.S. Pat. No. 10,395,102 which claims foreign priority under 35 U.S.C. 119 from United Kingdom Application No. 1605116.1 filed Mar. 24, 2016.

BACKGROUND OF THE INVENTION

This invention relates to apparatus for detecting motion in a sequence of frames, to a method of detecting motion in a sequence of frames.

It is sometimes desirable to perform motion detection in a sequence of frames captured by a camera sensor. For example, this can be a useful feature in security cameras since it allows the camera to flag up periods of motion in a video feed or to only record or transmit the captured video stream when motion is detected. It is often the case that very limited resources are available in camera hardware or associated processing equipment to perform motion detection and/or it is desired that motion detection is performed at low power. As a result, frames captured by a camera sensor are typically downsampled (e.g. from HD to VGA resolution) and motion detection performed in the downsampled frames at a low frame rate (e.g. at 10-15 frames per second rather than the, say, 30 frames per second provided by the camera sensor).

In order to further reduce the processing burden, frames are typically divided into a set of blocks in respect of which motion detection is performed, with each block comprising a plurality of pixels of the frame. However, even with these techniques, it still remains difficult to perform accurate motion detection using the limited computing resources present within camera hardware or associated processing equipment.

BRIEF SUMMARY OF THE INVENTION

According to a first aspect of the present invention there is provided a data processing device for detecting motion in a sequence of frames each comprising one or more blocks of pixels, the data processing device comprising:
  a sampling unit configured to determine image characteristics at a set of sample points of a block;
  a feature generation unit configured to form a current feature for the block, the current feature having a plurality of values derived from the sample points; and
  motion detection logic configured to generate a motion output for a block by comparing the current feature for the block to a learned feature representing historical feature values for the block.

The feature generation unit may be configured to form the current feature for the block in dependence on the determined image characteristic.

The feature generation unit may be configured to: compare the image characteristics of pairs of sample points of the set, each comparison being between the sample points of the respective pair; and form the current feature for the block such that each value represents the result of the comparison for a pair of sample points.

The learned feature may represent historical feature values for the pairs of sample points of the block.

Each value of the current feature formed in respect of a pair of sample points may have a corresponding value in the learned feature representing the historical value for that pair of sample points.

Each value of the current feature may comprise a bit as a binary representation of the result of the comparison by the motion detection logic for the respective pair of sample points.

The feature generation unit may be configured to randomly select each pair of points from the set of sample points of the block.

The feature generation unit may be configured to, for each value of the current feature, represent the result of the comparison with a binary value indicating which of the image characteristics of the sample points of the pair is greater in value.

The historical value at each of the values of the learned feature may be a weighted average of the results of comparisons by the feature generation unit for the respective pair of sample points of the block over a plurality of frames.

The current feature may be an image characteristic histogram derived from the sample points in which each value of the plurality of values corresponds to a bin defining a predefined range and includes a count of the number of sampling points having an image characteristic falling within that bin.

The learned feature may represent a historical image characteristic histogram for the block.

Each bin of the current feature may have a corresponding bin in the learned feature having a historical value for the predefined range of that bin.

The historical value at each bin of the learned feature may be a weighted average of the count of the number of sampling points having an image characteristic falling within that bin for the block over a plurality of frames.

Each frame of the sequence may comprise the same one or more blocks of pixels.

The sampling unit, feature generation unit and motion detection logic may be configured to perform their respective functions in respect of a plurality of blocks of each frame of a sequence, the feature generation unit being configured to maintain a learned feature for each of the blocks.

The sampling unit may be configured to identify each image characteristic in dependence on the pixel values of one or more pixels located at the sampling point.

The sampling unit may be configured to randomly generate the set of sample points of the block, the set of sample points being fixed for the block over the sequence of frames.

The sampling unit may be configured to randomly generate the set of sample points of the block according to a pseudo-random Halton sequence.

The feature generation unit may comprise the sampling unit.

The feature generation unit may be configured to maintain the learned feature of the block in dependence on sample points of the block received over a plurality of frames of the sequence.

The feature generation unit may be configured to maintain the learned feature of the block by, on receiving a frame of the sequence, decaying its plurality of values and allocating the values of the current feature to the corresponding values of the learned feature.

The feature generation unit may be configured to decay the values of the learned feature according to a predefined decay factor.

The feature generation unit may be configured to weight the values of the current feature according to a predefined weighting factor prior to allocating the values of the current feature to the values of the learned feature.

The motion detection logic may be configured to compare the current feature formed for the block to the learned feature of the block by calculating a measure of differences between the values of the current feature and the corresponding values of the learned feature.

The comparison performed by the motion detection logic may comprise forming an estimate as to whether, based on the measure of differences and to within a predefined or adaptive threshold, the current feature is expected based on the historical values of the learned feature of the block.

The motion detection logic may be configured to generate the motion output so as to indicate motion at the block if the estimate exceeds the predefined or adaptive threshold.

The motion detection logic may be configured to maintain an estimate of an expected degree of variation of the block and, in dependence on that estimate, form the adaptive threshold for the block.

The motion detection logic may be configured to maintain the estimate of the expected degree of variation of the block by, on receiving a frame, updating the estimate in dependence on a measure of the similarity between the current feature formed for the block of the frame and the learned feature maintained for the block.

The motion output may be a binary indication of motion identifying whether or not the result of the comparison performed by the motion detection logic is indicative of motion in the block.

Each block may comprise one or more pixels of the frame.

The data processing device may further comprise decision logic configured to generate an indication of motion for a frame based on the one or more motion outputs generated by the motion detection logic in respect of the blocks of that frame.

According to a second aspect of the present invention there is provided a method of detecting motion in a sequence of frames each comprising one or more blocks of pixels, the method comprising:
identifying image characteristics at a set of sample points of a block;
forming a current feature for the block, the current feature having a plurality of values derived from the sample points; and
generating a motion output for a block by comparing the current feature for the block to a learned feature having a plurality of values representing historical feature values for the block.

The method may further comprise:
forming pairs of sample points from the set of sample points of the block; and for each pair, comparing the image characteristics of the sample points of the pair, wherein the plurality of values of the current feature each represent the result of the comparison for a pair of sample points.

The learned feature may represent historical feature values for the pairs of sample points of the block.

Each value of the current feature formed in respect of a pair of sample points may have a corresponding value in the learned feature representing the historical value for that pair of sample points.

Each value of the current feature may comprise a bit as a binary representation of the result of the comparison by the motion detection logic for the respective pair of sample points.

The forming pairs of sample points may comprise randomly selecting each pair of points from the set of sample points of the block.

Forming a current feature for the block may comprise, for each value of the current feature, representing the result of the comparison with a binary value indicating which of the image characteristics of the sample points of the pair is greater in value.

The method may further comprise maintaining the learned feature such that the historical value at each of the values of the learned feature is a weighted average of the results of comparisons for the respective pair of sample points of the block over a plurality of frames.

Forming a current feature for the block may comprise deriving an image characteristic histogram from the sample points in which each value of the plurality of values corresponds to a bin defining a predefined range and includes a count of the number of sampling points having an image characteristic falling within that bin.

The learned feature may represent a historical image characteristic histogram for the block.

Each bin of the current feature may have a corresponding bin in the learned feature having a historical value for the predefined range of that bin.

The method may further comprise maintaining the learned feature such that the historical value at each bin of the learned feature is a weighted average of the count of the number of sampling points having an image characteristic falling within that bin for the block over a plurality of frames.

The method may further comprise randomly generating the set of sample points of the block, the set of sample points being fixed for the block over the sequence of frames.

The method may further comprise maintaining the learned feature of the block in dependence on sample points of the block received over a plurality of frames of the sequence.

Maintaining the learned feature of the block may comprise, on receiving a frame of the sequence, decaying the plurality of values of the learned feature and allocating the values of the current feature to the corresponding values of the learned feature.

Comparing the current feature formed for the block to the learned feature of the block may comprise calculating a measure of differences between the values of the current feature and the corresponding values of the learned feature.

Comparing the current feature formed for the block to the learned feature of the block may comprise forming an estimate as to whether, based on the measure of differences and to within a predefined or adaptive threshold, the current feature is expected based on the historical values of the learned feature of the block.

The method may further comprise maintaining an estimate of an expected degree of variation of the block and, in dependence on that estimate, forming the adaptive threshold for the block.

Maintaining the estimate of the expected degree of variation of the block may comprise, on receiving a frame, updating the estimate in dependence on a measure of the similarity between the current feature formed for the block of the frame and the learned feature maintained for the block.

The apparatus may be embodied in hardware on an integrated circuit. There may be provided a method of manufacturing, at an integrated circuit manufacturing system, the apparatus. There may be provided an integrated circuit definition dataset that, when processed in an integrated circuit manufacturing system, configures the system to manufacture the apparatus. There may be provided a non-transitory computer readable storage medium having stored thereon a computer readable description of an integrated circuit that, when processed in an integrated circuit manufacturing system, causes the integrated circuit manufacturing system to manufacture the apparatus.

There may be provided an integrated circuit manufacturing system comprising:

a non-transitory computer readable storage medium having stored thereon a computer readable integrated circuit description that describes the apparatus;

a layout processing system configured to process the integrated circuit description so as to generate a circuit layout description of an integrated circuit embodying the apparatus; and an integrated circuit generation system configured to manufacture the apparatus according to the circuit layout description.

There may be provided computer program code for performing a method as described herein. There may be provided non-transitory computer readable storage medium having stored thereon computer readable instructions that, when executed at a computer system, cause the computer system to perform the methods described herein.

BRIEF DESCRIPTION OF THE DRAWINGS

The present invention will now be described by way of example with reference to the accompanying drawings. In the drawings.

DETAILED DESCRIPTION OF THE INVENTION

The following description is presented by way of example to enable a person skilled in the art to make and use the invention. The present invention is not limited to the embodiments described herein and various modifications to the disclosed embodiments will be apparent to those skilled in the art.

Apparatus and methods are described for performing motion detection in a sequence of image frames based on a learned feature formed from sample points. In the examples described herein, the apparatus and methods form learned features describing the luminance values of a block or frame. Generally, the apparatus and methods may form binary features in respect of any input value, including measures of luminance, hue, exposure, colorfulness, chroma, saturation, lightness, and brightness.

Aspects of the present invention will now be described by way of example with respect to the apparatus shown in FIG. 1 for performing motion detection in a sequence of video frames captured at a camera.

Figure 1:
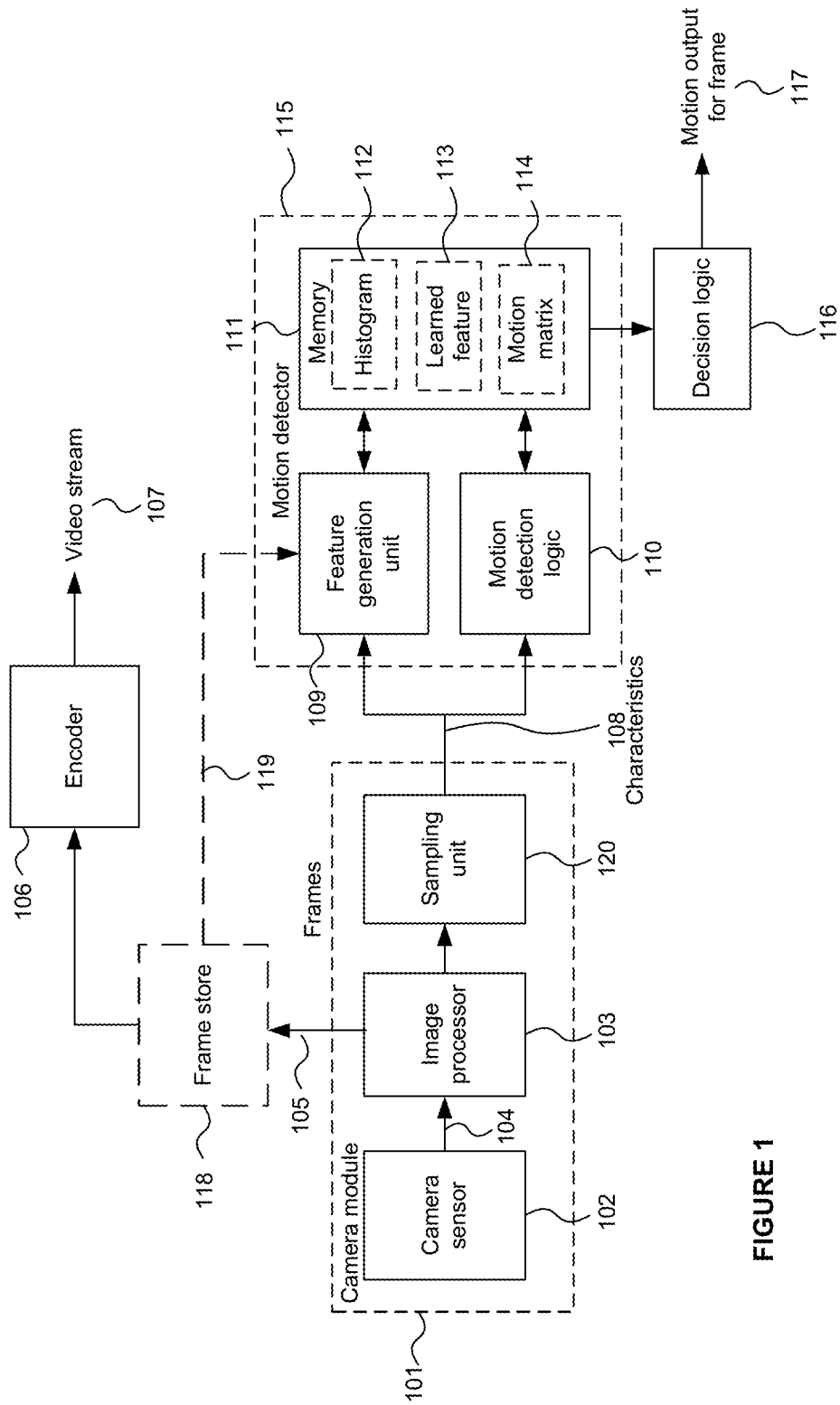
FIG. 1 is a schematic diagram of apparatus for performing motion detection in a stream of video frames captured at a camera.

FIG. 1 is a schematic diagram of apparatus which includes a camera module 101 and a motion detector 115. The camera module 101 comprises a camera sensor 102 which is arranged to provide frames to an image processor 103. The image processor 103 may generate various image characteristics for use at the motion detector and potentially other processing units on or outside the camera pipeline. For example, the image processor may gather statistics for use at auto white balance and auto exposure functions of a camera pipeline. The image processor is configured to provide image characteristics for one or more blocks of a frame. For example, each frame may be divided into a set of 16 blocks, with the image processor generating image characteristics in respect of each of the blocks.

A block may be part or all of a frame and any given block may or may not overlap with other blocks of the same frame. A block may be any collection of one or more pixels of a frame and may take any shape. The pixels of a block may or may not be contiguous within a frame. One or more pixels of a frame may not belong to any block defined for the frame. Any given pixel of a frame may belong to one or more blocks.

The image processor may be configured to generate image characteristics independently for one or more of the colour channels of an image frame (e.g. for each of the red, green and blue channels in the case of an RGB image captured at the camera). A measure of luminance provided by the image processor may be provided as a set of colour components or other image characteristics for interpretation at the motion detector as a measure of luminance.

Figure 4:
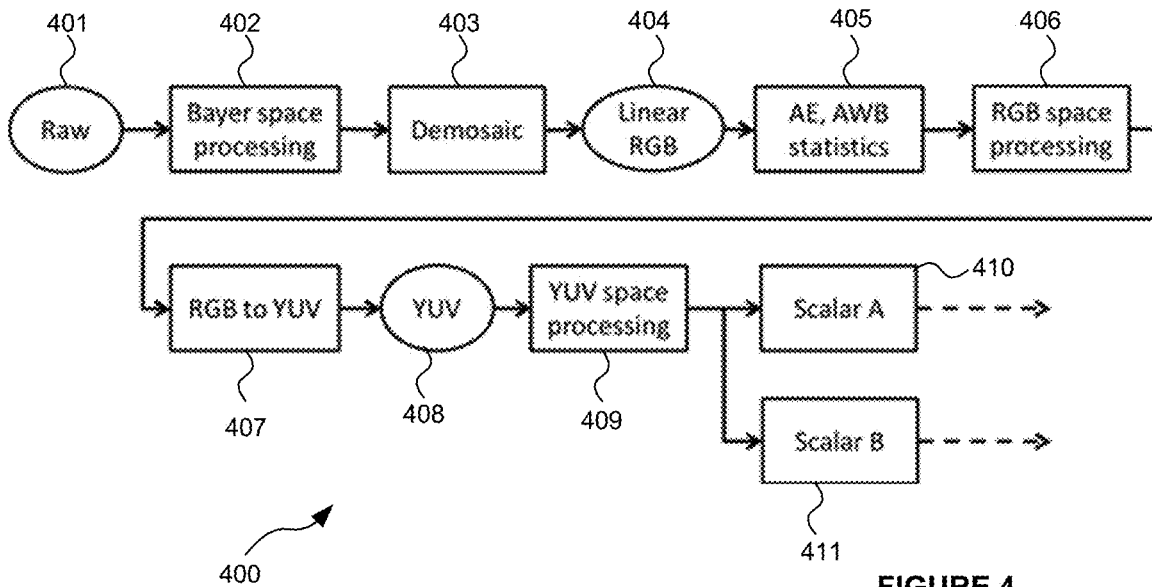
FIG. 4 is a flowchart illustrating processing which may be performed at an image processor.

A flowchart 400 illustrating an exemplary operation of the image processor 103 is shown in FIG. 4. The image processor receives a raw image 401 (of input stream 104) from the camera sensor 102 and performs Bayer space processing 402 and demosaicing 403 of the image. At 404 the image processor converts the raw image into an RGB image on which the image processor calculates statistics 405 for use at auto exposure and auto white balance functions of the camera pipeline (not shown). These statistics may be included in the image characteristics 108 provided to the motion detector 115. The image processor may additionally perform further RGB space processing 406, such as colour correction. The image processor converts the RGB image frame into the YUV colour space 407 so as to generate a YUV image frame 408, on which YUV space processing 409 may be performed (e.g. contrast enhancement). The resulting YUV frames may be provided at one or more different scales 410, 411 according to the requirements of subsequent units taking their input from the image processor, such as encoder 106. In this example, scalar 410 may output the stream of frames 105 provided to the encoder 106 for encoding into a video stream 107. Encoder 106 may receive frames via a frame store 118 at which frame data from the camera sensor, potentially processed by the image processor 103, may be stored. In some examples, the motion detector may receive a stream of frames from the image processor 103 (e.g. via scalar 411).

Image processing may be performed by image processor 103 at a lower resolution than that captured by the camera sensor. For example, the camera sensor may be a HD sensor but image processing may be performed at, say, VGA resolution (640×480 pixels). Lower resolutions such as VGA are typically sufficient for the purpose of generating statistics for motion detection and reduces the processing capabilities required of the image processor and/or allows image processing to be performed at low power. In some examples, the image frames captured by the camera sensor may be downscaled before being provided to the image processor, with the camera sensor providing full resolution frames directly to the encoder 106 (possibly via frame store 118 and/or another unit, e.g. to convert raw frames into YUV frames). The image processor may be configured to provide image characteristics describing one or more blocks of each frame for use at the motion detector but not the image frames themselves.

The arrangement of camera module 101 shown in FIG. 1 is merely one possibility and it will be appreciated that various other arrangements of a camera module are possible. In particular, the presence or otherwise of encoder 106 is not relevant to the operation of motion detector 115 and is included merely for illustrative purposes. The camera module 101 need only provide image characteristics 108 for the motion detector which are sufficient for the motion detector to form an output indicative of motion at a block. The image characteristics 108 may comprise one or more different types of image characteristics, such as exposure information and colour information for one or more colour channels. In other examples the camera module 101 may be any other source of image characteristics 108 for use at the motion detector (e.g. module 101 may derive image characteristics from stored image frames).

The image processor may provide a measure of luminance at points within a frame as an input value for the motion detector. The measure of luminance may represent an image characteristic 108 on the basis of which motion detection is performed. The measure of luminance may be provided in any suitable manner. For example, a luma value may be used as a measure of luminance for one or more pixels at points within a frame (e.g. a luma component of a YUV colour space), or a measure of luminance could comprise one or more individual colour components each expressing an average value of the respective colour component at a point within a frame.

Described below are two different motion detection techniques that can be performed using the apparatus of FIG. 1. The first uses a point sampling technique to generate histograms representing image characteristics of a block of a frame, and this is compared to a learned histogram to determine whether motion is present in the block. The second technique uses a binary feature to represent image characteristics of a block of a frame, and this is compared to a learned feature to determine whether motion is present in the block.

Point Sampled Histogram-Based Motion Detection

The processing pipelines of digital cameras commonly make use of histograms to summarise the frequency distribution of parameters captured by pixels of the camera sensor such as exposure or colour channel parameters. A histogram divides the range of possible input values of a parameter into a series of bins, with each bin representing a count of the number of pixels having a parameter falling within the respective range of that bin. Such histograms can be used by the image processing algorithms of the pipeline in order to perform control functions of the camera such as auto-exposure, auto-focus and auto-white balance. A camera sensor will generally include many millions of pixels and the use of such histograms helps to provide a summary of the characteristics of a captured frame at a level of detail which is appropriate and manageable by pipeline algorithms.

To facilitate motion detection processing (and potentially other image processing functions) on a per-block basis, a camera pipeline may generate histograms for each block representing the frequency distribution of image parameters within a block and potentially over several frames. For example, a histogram may be generated representing a typical measure of luminance for a block and motion may be identified in that block by looking for a sudden change in the luminance of the block which is indicative of motion.

However, the use of a limited number of pixels per block for a parameter and/or the use of narrow bins and/or the use of a low frame rate can lead to a sparsely-populated histogram being generated for a block, i.e. a histogram having a substantial proportion of empty bins and gaps in the histogram distribution. Such sparse histograms tend to be a poor quality representation of the underlying frequency distribution for a parameter.

Figure 9:
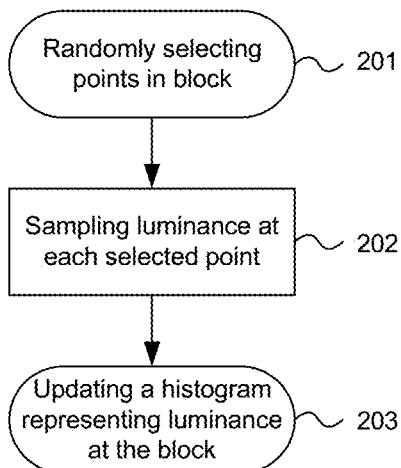
FIG. 9 is a flowchart illustrating a point sampling technique.

An efficient point sampling technique will now be described with reference to FIG. 9 which allows an accurate histogram to be generated at apparatus having insufficient resources to process an entire frame or block captured, for example, at camera sensor 102 (whether as a full resolution frame or following down-sampling at image processor 103). In the present example, the point sampling is of luminance values but it will be appreciated that the technique may be applied to point sampling of any image characteristic.

In the present example, a sampling unit 120 is configured to perform point sampling at a plurality of points within a block of a frame or other image region captured by the camera sensor. The points for sampling may be randomly or pseudo-randomly selected. This is 201 in FIG. 9.

The sampling unit may be provided with access to frame data stored at frame store 118 and/or receive frames from the image processor 103 (e.g. via scalar 411). Generally, the sampling unit may be provided anywhere at the apparatus, either as a separate entity or integrated with another entity. For example, the sampling unit 120 may form part of image processor 103 configured to provide sampled points (or values derived therefrom) as image characteristics 108 for each block, or the sampling unit 120 may form part of motion detector 115 (e.g. at feature generation unit 109).

The sampling unit may be configured to provide sampled points or values derived from sample points to a feature generation unit 109 of the motion detector 115. The sampling unit may be configured to calculate the relevant image characteristic at each sampling point of a frame (in this case luminance) from the available frame data—for example, the sampling unit may convert the RGB values stored for a given pixel into a luminance value for that pixel.

For each block, the sampling unit 120 is configured to sample luminance values at a selected set of points within the block (e.g. by reading the luminance values at the selected set of points from the frame data held at frame store 119). This is 202 in FIG. 9. The set of points may be selected by the sampling unit or any other entity. For a given sequence of frames in which motion detection is to be performed at the motion detector 115 in the manner described below, the selected set of points may be fixed for the sequence of frames in which motion is to be detected or the frames otherwise compared.

The set of points may be selected pseudo-randomly for a block, or otherwise. For example, a set of points may be selected according to a Halton sequence, where the position of a sample point within a block is given by:

$$s(n)=(H(n+20,2),H(n+20,3)) \quad (1)$$

where $H(n, b)$ is the $n^{th}$ value in a Halton sequence based on b. Since the first few values in a Halton sequence tend to be correlated, a predefined initial number (e.g. the first 20) of the Halton sequence values may be ignored in equation 1. The use of a Halton sequence has the advantage that the sample points are pseudo-randomly distributed within a block whilst at the same time being evenly distributed over a block. This ensures that the set of sample points selected for a block represent a well-distributed sampling of the image characteristics of a block.

Figure 8:
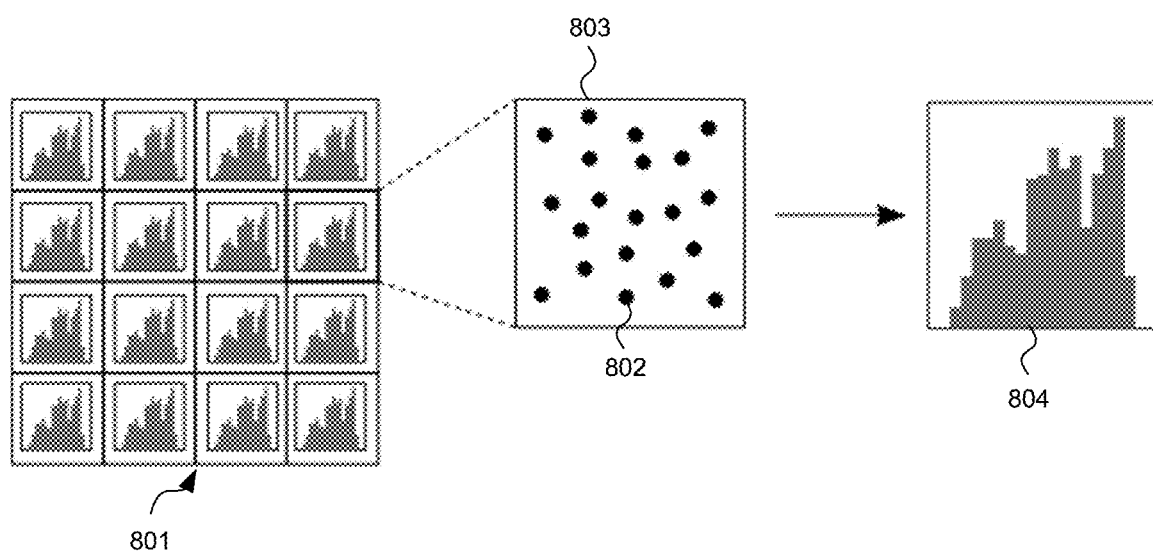
FIG. 8 illustrates the formation of a histogram for blocks of a frame based on a set of point samples.

An example of a set of pseudo-random sample points 802 generated for a block 803 of a frame 801 is shown in FIG. 8. A set of points may be generated in any suitable manner, including being: selected at design time and stored for use by the sampling unit; selected at initialisation of the sampling unit; and selected at runtime by the sampling unit in respect of one or more blocks of a sequence of frames. Once a set of points has been selected for a block, those same points are selected for subsequent frames of a sequence of frames captured by the camera sensor. For a frame divided into blocks which are identical in size, the same set of points may be used for each block.

Sample points may be selected using fractional coordinates (which may be supported at some hardware such as some GPUs). Sample points may be rounded to the nearest integer—if this leads to duplicate sample points being generated, the duplicate samples may be removed and replaced by further generated sample points.

In performing point sampling at each point of the set, the sampling unit may be configured to sample one or more pixels or groups of pixels at each point of the block according to any suitable sampling strategy. For example, at each point the sampling unit may sample a single pixel, or a plurality of pixels according to a predetermined pattern (e.g. the sampling unit may take an average of the luminance values of a pixel located at the sample point and its four closest pixels).

The sampling unit or another entity (e.g. the feature generation unit described below) may form a representation of the sampled image characteristics for the block. This is 203 in FIG. 9. For example, a histogram of the sampled image characteristics may be formed representing the distribution of image characteristics at the block. Examples of the formation of such a histogram or other representations (e.g. a binary feature representation) is described in more detail below.

In order to perform motion detection in a sequence of frames using luminance or another image characteristic established by point sampling, a feature generation unit 109 may be provided which is configured to make use of the sampled points (or derivative values thereof) in a comparison of a representation of the image characteristic between frames of the sequence. In the example described below, the feature generation unit 109 forms a representation of the image characteristic (e.g. a histogram) for one or more blocks of a frame; in other examples such a representation could be formed by the sampling unit 120. Motion detection logic 110 may be provided to detect motion in the sequence of frames based on the comparison performed by the feature generation unit. Examples of the operation of the feature generation unit and motion detection logic will now be described.

In a first example, for one or more blocks of a frame, the feature generation unit may be configured to maintain a histogram 804 describing the frequency distribution of luminance values at the set of sample points selected for the block. The histogram for each block may be maintained at memory 111, as indicated in FIG. 1 by label 112. For example, the feature generation unit may be configured to form a current histogram, $h_j^{current}$, for the luminance values sampled at a block of a given frame by allocating the luminance values received for the sample points of that block to one or more bins in a series of bins j each representing a range of luminance values. Each luminance value may be allocated to its respective histogram bin in any suitable manner. For example, a histogram having 256 bins each representing a possible 8-bit luminance value may be formed for the luminance values received for a block by:

$$h_j^{current} = h_j + 1, j = Y(s(n)), 0 \le n \le N_{samples} \quad (2)$$

Where $h_j^{current}$ is the value of bin j, $h_j$ is the previous value of that bin, and j is a bin index representing a luminance $Y(s(n))$, with $s(n)$ being a sample point and n being an index for the sample points.

The number of samples per block, $N_{samples}$, may be selected depending on the available processing resources and/or the required accuracy of the histogram.

By comparing the current histogram of a block to a learned histogram for the block which represents a historical frequency distribution for the block, it is possible to estimate a probability that the current luminance values of a block belong to the historical frequency distribution.

The feature generation unit 109 is configured to maintain a learned histogram for one or more blocks of a frame which, for each block, represents the frequency distribution of the luminance of that block over time. For example, on receiving a set of luminance values sampled for a block, the feature generation unit could update the histogram for the block with the received luminance values in the manner described below.

Each bin of a block's histogram may be initialized with a value appropriate to the implementation. For example, for a histogram having 256 bins, each bin of the histogram could initially be set to:

$$h_j = \frac{1}{256}, 0 \le j \le 255 \quad (3)$$

On receiving a set of sampled luminance values for a block, each bin of the histogram, $h_j^{old}$, for that block may be decayed so as to down-weight historical bin values relative to the new luminance values. This may be performed before the new luminance values are taken into account. For example, each bin of the histogram of a block may be decayed in dependence on a predefined or adaptive learning coefficient, learnCoeff which takes a value between 0 and 1:

$$h_j^{decayed} = (1 - learnCoeff) * h_j^{old}, 0 \le j \le 255 \quad (4)$$

A suitable value for learnCoeff may be empirically determined.

A 256-bin learned histogram may then be maintained according to equation 5 by, for example, as each frame is received, decaying the bins of the histogram and allocating the values held at the bins of the current histogram formed by the feature generation unit to the bins of the learned histogram weighted by learnCoeff which takes a value between 0 and 1:

$$h_j^{learned} = (1 - learnCoeff) * h_j^{old} + learnCoeff * h_j^{current} \quad (5)$$

Over a number of frames, a non-parametric representation of the expected distribution of pixel values for a particular block may thus be built up which allows for complex multi-modal behaviour to be captured.

Once the feature generation unit has formed the current histogram for a block, it may be compared to the learned histogram at motion detection logic 110 in order to obtain a measure of similarity between the two histograms. The current and learned histograms may be compared using the earth mover's distance (EMD) or Wasserstein metric. This choice has the advantage that it is simple to compute.

For the two histograms to be compared they may first be normalized, for example by:

$$h_j^{normalised, learned} = \frac{h_j^{learned}}{\sum_{k=0}^{255} h_j^{learned}} \quad (6)$$

and for $h_j^{current}$, similarly:

$$h_j^{normalised, current} = \frac{h_j^{current}}{\sum_{k=0}^{255} h_j^{current}} \quad (7)$$

A measure of similarity may then be formed at the motion detection logic 110 using the earth mover's distance (EMD) which will be loosely referred to as a probability that, given the learned luminance histogram, the current luminance histogram represents foreground motion, $P_{foreground}$:

$$P_{foreground} = EMD(h^{learned}, h^{current}) \quad (8)$$

where EMD(a, b) is the earth mover's distance between the two normalised histogram distributions.

In this manner, a motion probability $P_{foreground}$ may be formed for each block from the respective current and learned histogram of the block. The motion detection logic may then form a decision as to whether the block is to be classified as having motion (foreground, $F_i=1$) or no motion (background, $F_i=0$). One approach is to compare the probability that a luminance value belongs to the histogram distribution maintained for that block (i.e. is background) to a predefined or adaptive threshold, T:

$$F_i = \begin{cases} 0 & P_{foreground}(Y_i) \leq T \\ 1 & P_{foreground}(Y_i) > T \end{cases} \quad (9)$$

Thus, if the two histograms are sufficiently similar then the block is classified as background (no motion); otherwise, the block can be classified as foreground (motion). A suitable threshold may be identified in any way, including: empirically determined; derived from the sequence of frames (e.g. as one or more statistics generated at the image processor 103); and adaptively calculated in any suitable manner.

For blocks that contain relatively constant pixel values, the above approach can work well. However, using an adaptive threshold can provide better performance. For example, for blocks containing pixels with values that frequently change due to dynamic image features which do not themselves represent gross motion in the scene, it can be appropriate to use a higher threshold so as to avoid false positives. Such changes in pixel luminance can arise not only due to changes in the scene, such as leaves moving in the wind, but also from sensor noise.

An adaptive threshold may be generated from a historic per block probability, earned, which may be formed as:

$$P_i^{learned} = (1 - learnCoeff) * P_i^{old} + learnCoeff * P_i^{current} \quad (10)$$

where $P_i^{current}$ is the probability that the current luminance histogram of the i-th block represents foreground motion according to equation 8 and $P_i^{old}$ is the current historic per block probability for the i-th block. The learning coefficient may be the same used in equation 5.

The historic per block probability provides an estimate of the expected amount of variation, or expected motion, within a block based on historical point samples for the block. An adaptive threshold, $T_{adaptive}$, may then be formed as:

$$T_{adaptive} = T_{user} P_i^{learned} \quad (12)$$

where $T_{user}$ is a predefined parameter which may be, for example, empirically selected by a user or automatically determined in dependence on one or more algorithms so as to achieve the desired performance of the system.

The use of such an adaptive threshold may mean that in areas of high background motion the algorithm becomes less sensitive to motion due to the adaptive threshold increasing in these areas. Typically however, the background motion caused by sensor noise or small scene changes can be expected to be much less than foreground motions in a scene.

Binary Feature-Based Motion Detection

An alternative approach to detecting a change in image characteristics of a block which may be indicative of motion in that block will now be described. In the present example, the alternative approach again makes use of luminance as the image characteristic, but generally any suitable image characteristic may be used as appropriate to the particular implementation. The alternative approach described in the present example makes use of a binary feature to represent the content (e.g. luminance) of a block instead of or as well as a histogram. More generally a binary feature may be any kind of current feature formed for a block, the values of that current feature not being limited to being binary bits.

Alternatives to using histograms of image parameters as the basis for motion detection have been proposed. For example, M. Heikkila and M. Pietikäinen in "A Texture- Based Method for Modeling the Background and Detecting Moving Objects," IEEE Transactions on Pattern Analysis and Machine Intelligence, vol. 28, pp. 657-662, 2006 describe identifying local binary patterns in the pixels of a frame and looking for changes in those binary patterns which are indicative of motion in the frame. Such binary patterns are fast to compute but are not always representative of the general block or frame in which they are calculated. As a result, this technique can suffer from false positives and, without careful tuning of the system, it can be difficult to achieve good performance over a wide range of different video streams (e.g. of markedly different scenes and/or lighting conditions).

Referring again to FIG. 1, as noted, the motion detector comprises a feature generation unit 109 and motion detection logic 110. When using binary feature motion detection, the feature generation unit 109 maintains a learned feature for a block and the motion detection logic 110 forms a motion output for the block based on the learned feature of the block, as will be described below by way of example. The feature generation unit and motion detection logic may operate in any manner, including in series or concurrently/in parallel. The feature generation unit and motion detection logic may operate in parallel because the learned feature of a block may be used by the motion detection logic prior to the feature generation unit updating the learned feature with the received image characteristic. The motion detector 115 may advantageously be configured to maintain a learned feature for one or more blocks of a frame using the above-described point sampling to capture image characteristics (e.g. luminance) values for each block; in other examples, the motion detector may operate using image characteristics sampled from or formed in respect of one or more blocks of a frame in any other manner.

Rather than generating a histogram 112 for each block, the feature generation unit 109 may be configured to form a current binary feature for each block from a set of sample points and also maintain a learned feature for each block representing the historical content of the binary feature for the block. The learned feature 113 may be held at memory 111.

The sampling unit 120 may be configured to perform point sampling in any suitable manner, including in any of the ways described above in the "Point sampled histogram-based motion detection" section. For example, the sampling unit may be configured to sample a pseudo-random selection of sample points of a block which have been selected according to a Halton sequence (see equation 1 above). In other examples, another entity may perform the point sampling (in any suitable manner, including in any of the ways described herein for the sampling unit) and pass the values (or the comparison of pairs of values as described below) to the feature generation unit.

Figure 6:
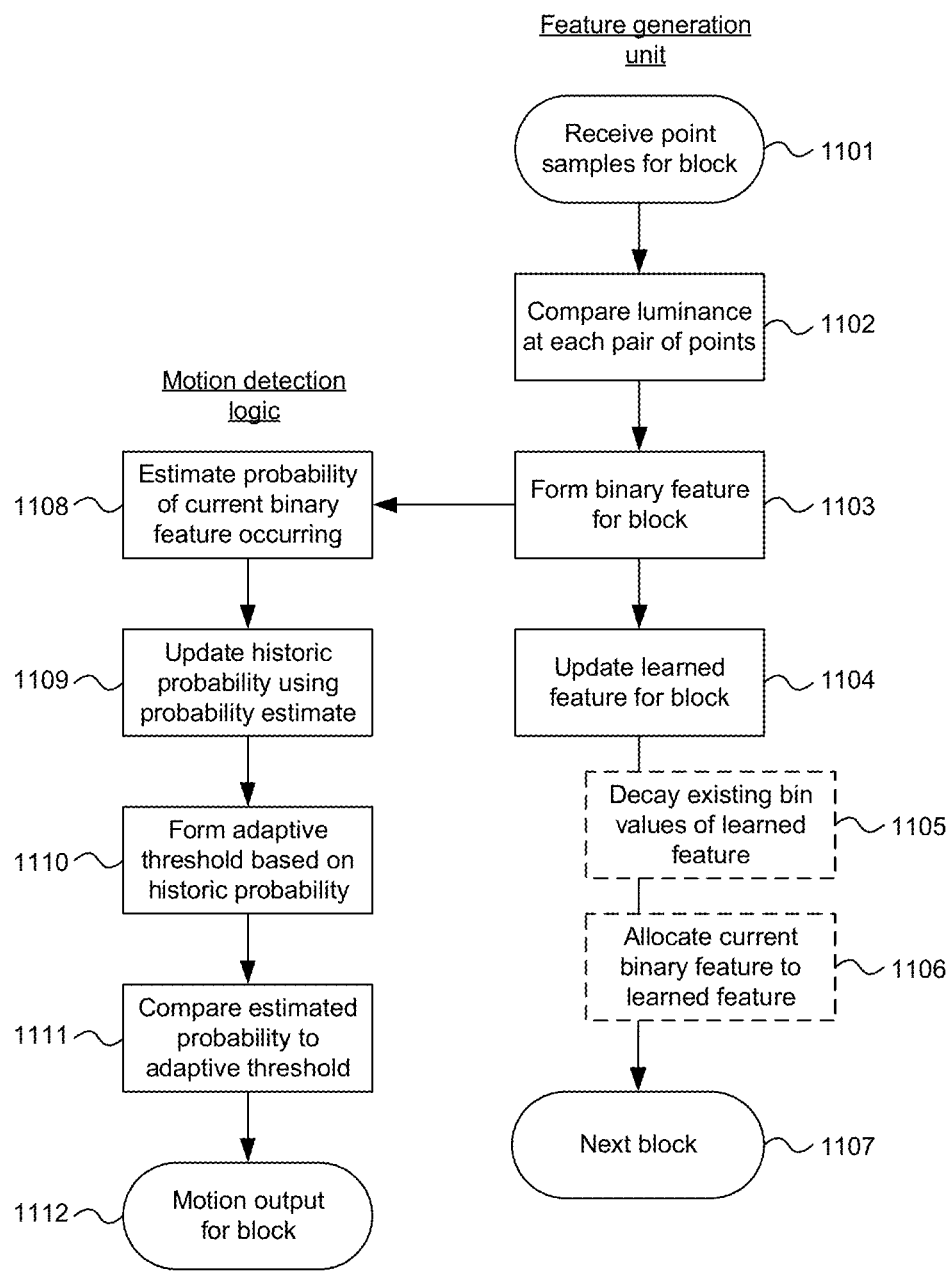
FIG. 6 is a flowchart illustrating the operation of a feature generation unit and motion detector according to a second aspect.

A flowchart illustrating an example of the operation of the motion detector 115 is shown in FIG. 6. On receiving point samples for a block 1101 (e.g. from camera module 101), the feature generation unit 109 and motion detection logic 110 perform their respective functions in order to, respectively, maintain a learned feature for the block and form a motion output for the block.

The feature generation unit may be configured to compare the values at pairs of sample points such that a binary value is formed for each point pair. This is 1102 in FIG. 6. A binary 1 may be used to indicate that a first point of the pair has a greater value than the second point and a binary 0 may be used to indicate that the second point of the pair has a greater value than the first point. For example, for the $j^{th}$ point pair a binary value $s_j$ may be formed as:

$$s_j = \begin{cases} 0 & Y(x_{A_j}) < Y(x_{B_j}) \\ 1 & Y(x_{A_j}) \geq Y(x_{B_j}) \end{cases}, \quad 0 < j < N_{pairs} \quad (13)$$

where $Y(x_{A_j})$ and $Y(x_{B_j})$ are the luminance values at the sample points of the pair.

Each pair of points may be (pseudo-)randomly selected from the set of sample points of a block, or selected according to some predefined algorithm. If the sample points are themselves a (pseudo-)random set then it does not matter which point of a pair is labelled the first and which the second of the pair. The selection of sample points may be performed such that each sample point belongs to at most one pair. Sample points may in some examples belong to more than one pair: this could result in impaired performance but would typically reduce the number of memory accesses. Every one of the sample points of a block may be allocated to at least one pair. A set of binary values satisfying $N_{samples}=2N_{pairs}$ may be generated according to equation 13. Each block of a frame may share the same set of sample points and potentially the same set of sample point pairs. Once a set of sample point pairs have been defined for a block of a frame, the same set of sample point pairs are used for that block for subsequent frames so as to allow comparison of a binary feature to a learned feature.

Figure 2:
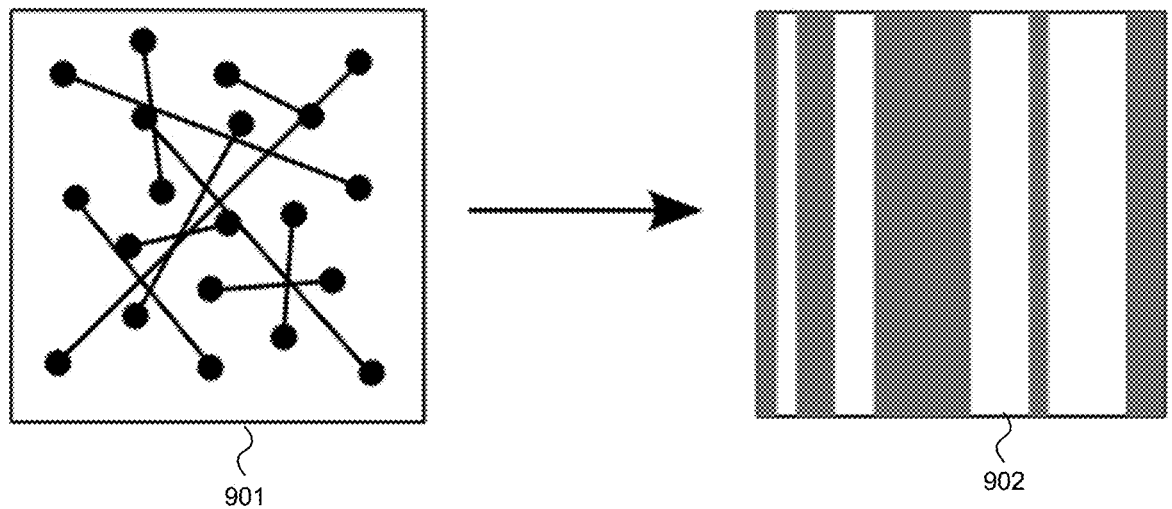
FIG. 2 illustrates the formation of a binary feature for a block based on a random selection of pairs of sample points.

By forming a binary value representing the result of a comparison of the luminance values for each of a plurality of pairs of points of a block, a binary feature may be constructed for the block which represents a sampling of the luminance values of the block. This is 1103 in FIG. 6. The binary feature for a block is formed based on binary values formed for the set of sample pairs defined for the block. This process is illustrated in FIG. 2 which shows a set of pairs of sample points of a block 901 being used to form a binary feature 902. The result of the binary comparison of each pair represents a bit of the binary feature 902. In binary feature 902, a dark band represents a "1" and a white band represents a "0".

The feature generation unit may be configured to maintain a learned feature 113 at memory 111 which represents an expected value for each point pair. The learned feature comprises a series of values, with each value corresponding to a point pair of the block. Each value of a learned feature may lie, for example, between 0 and 1. A value close to 0 would indicate that the respective pair would be expected to have a value of 0; a value close to 1 would indicate that the respective pair would be expected to have a value of 1. A pair that changes equally often between one and zero would tend to a learned value of 0.5. A learned feature for a block with stable pixel luminance values will have most of its values close to either one or zero. A learned feature for a block whose pixel luminance values are regularly changing will have its values spread over a much greater range. In other examples the values of a learned feature may lie within any other suitable range.

The values of a learned feature 113 may be maintained for a block by the feature generation unit according to:

$$s_j^{learned} = (1 - learnCoeff) * s_j^{old} + learnCoeff * s_j^{current} \quad (14)$$

where $s_j^{old}$ is the existing value of the learned feature for pair j, and $s_j^{current}$ is the binary value of the corresponding point pair in the current binary feature formed by the feature generation unit. This is 1104 in FIG. 6 and comprises decaying the existing values $s_j^{old}$ of the learned feature 1105 and allocating the values of the current binary feature $s_j^{current}$ to the learned feature 1106. Once the feature generation unit has updated the learned feature for a block it may move onto the next block of the frame 1107 and operate on the point samples received for that block until all of the blocks of a frame have been processed.

Each value of a learned feature may be initialized as:

$$s_j^{learned} = 0.5, \; 0 \le j \le N_{pairs} \tag{15}$$

Figure 3:
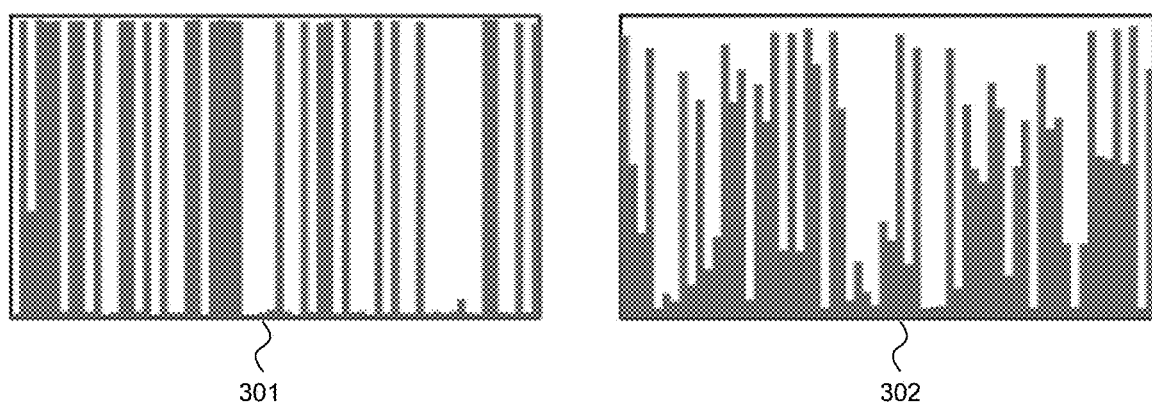
FIG. 3 illustrates a learned feature for a block with stable content and a learned feature for a block with unstable content.

FIG. 3 illustrates two examples of learned features. Learned feature 301 represents a block having stable luminance content, with the values mostly lying close to 0 or 1 (i.e. the learned feature indicates the expected value of point pairs with a high confidence). Learned feature 302 represents a block having unstable luminance content, with many of the values lying intermediate between 0 and 1 (i.e. the learned feature indicates the expected value of point pairs with a low confidence).

A learned feature 113 for a block may be used at the motion detection logic 110 to form a measure of the probability that a given block includes motion by comparing the current binary feature for the block to the learned feature for the block. This may be done prior to the learned feature being updated with the current binary feature. The term probability as used herein may not be a true probability which takes a value between 0 and 1 but any measure of the likelihood of a received binary feature (or one or more image characteristics in previous sections) belonging to a learned distribution (e.g. a histogram or learned feature). A suitable measure of probability may be calculated at the motion detection logic using a sum of absolute differences of the learned and current values of the point pairs, for example according to:

$$P_{foreground} = \frac{1}{N_{pairs}} \sum_{j=0}^{N_{pairs}} |s_j^{learned} - s_j^{current}| \tag{16}$$

This is 1108 in FIG. 6. Alternative measures, such as sum of squared differences, may be used. Preferably the measure used is calculated such that each point pair is evaluated independently and there is no ordering relationship between the pairs.

The motion detection logic 110 may use the probability $P_{foreground}$ calculated in respect of a block in order to determine whether that block is likely to represent motion or not. The probability may be a measure of the likelihood that the current binary feature formed for a block may be expected given the learned feature formed in respect of that block. The motion detection logic may form a binary decision as to whether the probability indicates that the block contains motion (i.e. represents foreground in the captured scene), with a decision of foreground motion being $F_i=1$ and a decision that the block represents background (not motion) being $F_i=0$. One approach is to compare the calculated probability to a predefined or adaptive threshold, T, as described above with respect to equation 10.

A suitable threshold may be identified in any way, including: empirically determined; derived from the sequence of frames (e.g. as one or more statistics generated at the image processor); and adaptively calculated in any suitable manner. For example, a suitable adaptive threshold may be determined in accordance with equations 11 and 12 above such that an adaptive threshold is generated from a historic per block probability, $P_i^{learned}$, formed as:

$$P_i^{learned} = (1 - learnCoeff) * P_i^{old} + learnCoeff * P_i^{current} \tag{17}$$

This is 1109 in FIG. 6. The learning coefficient may be the same used in equations 6 and/or 11. The historic per block probability provides an estimate of the expected amount of variation, or expected motion, within a block based on historical point samples for the block. An adaptive threshold, $T_{adaptive}$, may then be formed as:

$$T_{adaptive} = T_{user} P_i^{learned} \tag{18}$$

where $T_{user}$ is a predefined parameter which may be, for example, empirically selected by a user or automatically determined in dependence on one or more algorithms so as to achieve the desired performance of the system. This is 1110 in FIG. 6.

In this manner, a binary indication may be formed for each block of a frame as to whether the point sampled luminance values are indicative of motion being present in the frame:

$$F_i = \begin{cases} 0 & P_{foreground}(Y_i) \le T_{adaptive} \\ 1 & P_{foreground}(Y_i) > T_{adaptive} \end{cases} \tag{19}$$

where the motion detection logic classifies a block as including motion ($F_i=1$) if the probability exceeds the adaptive threshold, and as not including motion ($F_i=0$) if the probability does not exceed the adaptive threshold. This is 1111 in FIG. 6.

Figure 7:
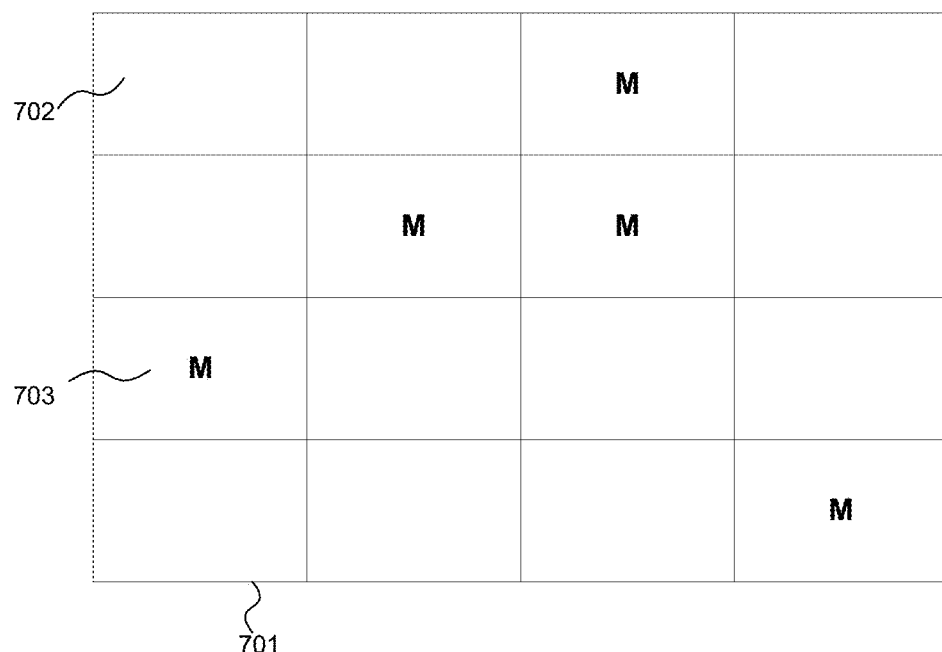
FIG. 7 illustrates a binary output from a motion detector operated on an image frame divided into a plurality of blocks.

Regardless of whether the point sampled histogram-based motion detection or binary feature-based motion detection is used, by forming a binary decision as to whether each block of a frame is considered to represent motion, motion detection logic 110 may store a motion matrix 114 in memory 111 which represents the block-wise motion determined to be present in a received frame. This may be the motion output for a block 1112. An example of the information held at stored matrix 114 is shown in FIG. 7 for a frame 701. The frame is divided into 16 blocks, with the motion matrix 114 indicating which of the blocks represents motion in the frame: blocks (e.g. 703) which are indicative of motion are labelled in the figure with an 'M', and blocks (e.g. 702) which are not indicative of motion are not labelled in the figure with an 'M'. These labels are merely illustrative in the figure; in general any indication of whether or not motion is determined to be present at a block may be used. Motion matrix 114 may represent motion information for one or more blocks of a frame in any suitable manner, including, for example, as a binary string, an array of values, or as information encoded into or associated with the frame itself. A motion matrix may or may not be a rectangular array of values.

In the examples described herein, decision logic 116 may be configured to use the motion information generated at the motion detector 115 (e.g. a motion matrix) for one or more blocks of a frame to form a motion output for a frame 117. For example, motion detection logic 116 may be configured to identify motion in a frame when motion is detected in one or more blocks which lie within a defined area of interest, or motion may be identified when a predetermined contiguous number of blocks are indicative of motion. A motion output 117 for a frame may take any suitable form, including as a binary indication or some measure of the degree of motion observed in a frame (e.g. a number or proportion of blocks which the motion detector 115 has identified as being representative of motion).

The decision logic may further receive (e.g. along with or included in a motion matrix) measures of the likelihood of block luminance values (e.g. as formed at the motion detection logic) occurring given the frequency distribution represented by a histogram formed by the feature generation unit for those blocks. This can allow the decision logic to further interpret the motion matrix formed for a frame. For example, the decision logic could be configured to check whether one or more blocks in which motion is not indicated in a motion matrix are surrounded in their respective frame by blocks in which motion is indicated in the motion matrix, and, if that is the case, interpret those surrounded blocks as also being indicative of motion if their respective measures of likelihood lie close to the predefined or adaptive threshold determined by the motion detection logic.

A motion detector 115 configured according to the principles described herein may be embodied at a low power processor. A motion output for a block or frame (e.g. 117) generated by the motion detector or associated decision logic 117 may be arranged to wake up another processor, such as encoder 106. This particular example enables motion-activated recording to be implemented in an energy efficient manner.

The use of point sampling, binary features and learned features as described herein may be employed with any other suitable image characteristic and is not limited to the use of luminance values. For example, the techniques may be used with pairs of values for a block where the values are measures of spread in an image characteristic (e.g. luminance, a measure of colour etc.) such as a standard deviation or variance.

A frame comprises a plurality of pixels each having an associated image characteristic. The term pixel is used herein to refer to any kind of image element in respect of which an image characteristic is calculated, sampled, sensed or otherwise formed. A pixel is not limited to having a one-to-one correspondence to a sensing element of a digital camera (e.g. a red, green or blue sensing element or a collection thereof). The term random as used herein encompasses both truly random and pseudorandom distributions, selections, or values; the term pseudorandom encompasses both truly random and pseudorandom distributions, selections, or values.

The camera module and motion detector of FIG. 1 are shown as comprising a number of functional blocks. This is schematic only and is not intended to define a strict division between different logic elements of such entities. Each functional block may be provided in any suitable manner. It is to be understood that intermediate values described herein as being formed by any of the entities of a camera module or motion detector need not be physically generated by the camera module or motion detector at any point and may merely represent logical values which conveniently describe the processing performed by the camera module or motion detector between its input and output.

The flowcharts of FIGS. 4 and 6 are schematic only. The spacing and relative position of the steps in the examples shown in those flowcharts is not to be taken as indicative of the precise time when each step occurs in absolute terms or relative to other steps. The flowcharts merely illustrate an exemplary order in which steps may be performed in accordance with the examples described herein.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a data processing device configured to perform any of the methods described herein, or to manufacture a data processing device comprising any apparatus described herein. An integrated circuit definition dataset may be, for example, an integrated circuit description.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a data processing device will now be described with respect to FIG. 5.

Figure 5:
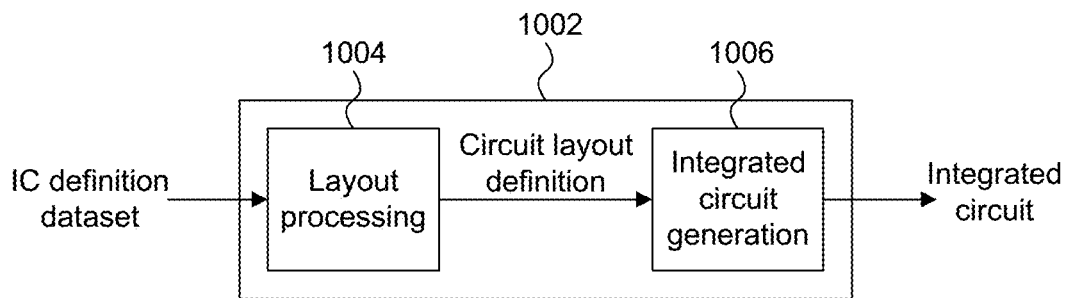
FIG. 5 is a schematic diagram of an integrated circuit manufacturing system.

FIG. 5 shows an example of an integrated circuit (IC) manufacturing system 1002 which comprises a layout processing system 1004 and an integrated circuit generation system 1006. The IC manufacturing system 1002 is configured to receive an IC definition dataset (e.g. defining a data processing device as described in any of the examples herein), process the IC definition dataset, and generate an IC according to the IC definition dataset (e.g. which embodies a data processing device as described in any of the examples herein). The processing of the IC definition dataset configures the IC manufacturing system 1002 to manufacture an integrated circuit embodying a data processing device as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a data processing device without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A data processing device for detecting motion in a sequence of video frames each comprising one or more blocks of pixels, the data processing device comprising:
   a sampling unit configured to determine image characteristics at a set of sample points of a block in a current frame of said sequence;
   a feature generation unit configured to compare the image characteristics of pairs of sample points of the set, and form a current feature for the block in dependence on the determined image characteristics, the current feature having a plurality of values derived from the sample points such that each value represents the result of the comparison for a pair of sample points; and motion detection logic configured to generate a motion output for the block by comparing the current feature for the block to a learned feature representing historical feature values for the block in frames of said sequence previous to said current frame.

2. A data processing device as claimed in claim 1, wherein the learned feature represents historical feature values for the pairs of sample points of the block.

3. A data processing device as claimed in claim 1, wherein each value of the current feature comprises a bit as a binary representation of the result of the comparison by the motion detection logic for the respective pair of sample points.

4. A data processing device as claimed in claim 1, wherein the feature generation unit is configured to randomly select each pair of points from the set of sample points of the block.

5. A data processing device as claimed in claim 1, wherein the feature generation unit is configured to, for each value of the current feature, represent the result of the comparison with a binary value indicating which of the image characteristics of the sample points of the pair is greater in value.

6. A data processing device as claimed in claim 1, wherein the historical value at each of the values of the learned feature is a weighted average of the results of comparisons by the feature generation unit for the respective pair of sample points of the block over a plurality of frames.

7. A data processing device as claimed in claim 1, wherein the sampling unit is configured to randomly generate the set of sample points of the block, the set of sample points being fixed for the block over the sequence of frames.

8. A data processing device as claimed in claim 1, wherein the sampling unit is configured to randomly generate the set of sample points of the block according to a pseudo-random Halton sequence.

9. A data processing device as claimed in claim 1, the data processing device further comprising decision logic configured to generate an indication of motion for a frame based on the one or more motion outputs generated by the motion detection logic in respect of the blocks of that frame.

10. A data processing device as claimed in claim 1, wherein the motion output is a binary indication of motion identifying whether or not the result of the comparison performed by the motion detection logic is indicative of motion in the block.

11. A data processing device as claimed in claim 1, wherein each comparison of the image characteristics of pairs of sample points of the set is between the sample points of the respective pair.

12. A data processing device as claimed in claim 11, wherein each value of the current feature formed in respect of a pair of sample points has a corresponding value in the learned feature representing the historical value for that pair of sample points.

13. A data processing device as claimed in claim 1, wherein the feature generation unit is configured to maintain the learned feature of the block by, on receiving a frame of the sequence, decaying, according to a predefined decay factor, its plurality of values and allocating the values of the current feature to the corresponding values of the learned feature.

14. A data processing device as claimed in claim 13, wherein the feature generation unit is configured to weight the values of the current feature according to a predefined weighting factor prior to allocating the values of the current feature to the values of the learned feature.

15. A data processing device as claimed in claim 1, wherein the comparison performed by the motion detection logic comprises forming an estimate as to whether, based on a measure of differences between the values of the current feature and the corresponding values of the learned feature, and to within a predefined or adaptive threshold, the current feature is expected based on the historical values of the learned feature of the block.

16. A data processing device as claimed in claim 15, wherein the motion detection logic is configured to generate the motion output so as to indicate motion at the block if the estimate exceeds the predefined or adaptive threshold.

17. A data processing device as claimed in claim 15, wherein the motion detection logic is configured to maintain an estimate of an expected degree of variation of the block and, in dependence on that estimate, form the adaptive threshold for the block.

18. A data processing device as claimed in claim 17, wherein the motion detection logic is configured to maintain the estimate of the expected degree of variation of the block by, on receiving a frame, updating the estimate in dependence on a measure of the similarity between the current feature formed for the block of the frame and the learned feature maintained for the block.

19. A method of detecting motion in a sequence of video frames each comprising one or more blocks of pixels, the method comprising:

identifying image characteristics at a set of sample points of a block in a current frame of said sequence;

comparing the image characteristics of pairs of sample points of the set;

forming a current feature for the block in dependence on the identified image characteristics, the current feature having a plurality of values derived from the sample points such that each value represents the result of the comparison for a pair of sample points; and generating a motion output for a block by comparing the current feature for the block to a learned feature having a plurality of values representing historical feature values for the block in frames of said sequence previous to said current frame.

20. A non-transitory computer readable storage medium having stored thereon a computer readable dataset description of an integrated circuit that, when processed in an integrated circuit manufacturing system, causes the integrated circuit manufacturing system to manufacture a data processing device embodied in hardware on an integrated circuit, the data processing device for detecting motion in a sequence of video frames each comprising one or more blocks of pixels, the data processing device comprising:

a sampling unit configured to determine image characteristics at a set of sample points of a block in a current frame of said sequence;

a feature generation unit configured to compare the image characteristics of pairs of sample points of the set, and form a current feature for the block in dependence on the determined image characteristics, the current feature having a plurality of values derived from the sample points such that each value represents the result of the comparison for a pair of sample points; and motion detection logic configured to generate a motion output for a block by comparing the current feature for the block to a learned feature representing historical feature values for the block in frames of said sequence previous to said current frame.

\* \* \* \* \*